UNITED STATES PATENT OFFICE.

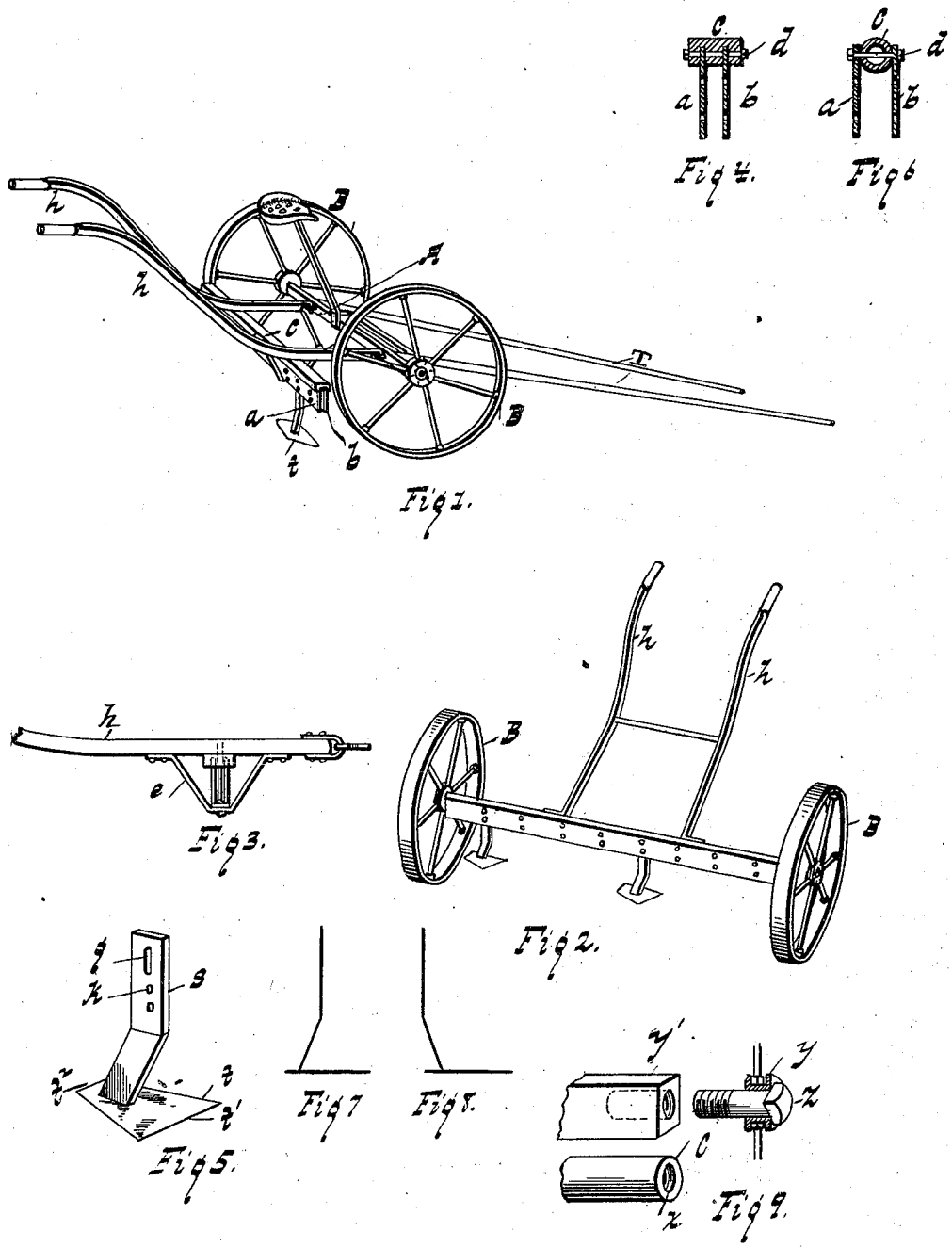

ALEXANDER T. FISCHER AND HENRY CORDES, OF DETROIT, MICHIGAN.

WEEDER AND THINNER.

SPECIFICATION forming part of Letters Patent No. 692,648, dated February 4, 1902.

Application filed February 28, 1901. Serial No. 49,363. (No model.)

*To all whom it may concern:*

Be it known that we, ALEXANDER T. FISCHER and HENRY CORDES, citizens of the United States, residing at Detroit, county of Wayne, State of Michigan, have invented a certain new and useful Improvement in Weeders and Thinners; and we declare the following to be a full, clear, and exact description of the invention, such as will enable others skilled in the art to which it pertains to make and use the same, reference being had to the accompanying drawings, which form a part of this specification.

This invention relates to weeding and thinning implements, and has for its object an improvement in a wheeled implement adapted to be used for cutting weeds and stirring the ground and thinning plants to a proper distance in rows in which they are planted. The implement is intended to be used either as a large implement to be drawn by a horse or as a smaller implement to be propelled by manual power.

In the drawings, Figure 1 shows in perspective an implement to be drawn by a horse and provided with a riding-seat. Fig. 2 shows in perspective a smaller implement. Fig. 3 shows the connection of the handle to the hoe-holder. Fig. 4 is a cross-section of the hoe-holder. Fig. 5 is a perspective of the hoe and its shank. Fig. 6 is a cross-section of a tubular back to which side plates are bolted. Figs. 7 and 8 are diagrams indicating the shape of the hoe blades and shanks. Fig. 9 shows the wheel-spindle to be used with either the solid back of Fig. 4 or the tubular back of Fig. 6.

The implement consists, primarily, of a hoe-holder and means for attaching the hoe-holder to wheels by which it is carried. The hoe-holder consists of two flat perforated plates $a$ and $b$. These are stiffened by a back C, preferably of wood, into which the plates are inserted and in which they are held by bolts $d$. To the back C are secured handles $h$, and for the implement shown in Fig. 1 the handles are secured at their front end by jointed connections to the axle A of carrying-wheels B. Thills T are secured to the axle. The handles $h$ are secured to the back C and plates $a$ $b$ by swivel connections or by bolts, each of which passes vertically through the handle which it secures and down between the plates $a$ and $b$ and through a brace $e$, that aids in holding the plates vertical with respect to the handles, but allows the handles to assume a position at an angle to the long axis of the holder—that is, the holder, the axle, and the portions of the two handles between the holder and the axle are joined together by pivot connections, and the holder and handles are capable of a movement that swings the holder along a line parallel to the axle. This enables the workman to shift the holder and the cutting-blades held by it somewhat, if he desires to do so.

The plates $a$ and $b$ are provided with numerous holes that are arranged opposite one another and in vertical sets of two in each set, and the teeth (of which one is represented in Fig. 5) are held between the bars by inserting the shank $s$ into the space between the plates and securing the shank in place by bolts, one of which is inserted through one of the holes $k$ and another of which is inserted through the slot $g$. There are a plurality of holes $k$ and a slot $g$, and these allow the parts to be assembled and adjusted vertically, and the slots $g$ and the hole $k$ compensate for any irregularity there may be in drilling the holes in the plates $a$ and $b$.

The smaller implement shown in Fig. 2 has exactly the same arrangement of plates, of hoe, and shank connected therewith; but the wheels are arranged to be mounted at the ends of the plates.

We employ either of the structures shown in Fig. 9. When the back C is of wood, a block $y'$ is inserted between the plates $a$ $b$. In the block $y'$ is a threaded hole into which is run the threaded end of the wheel-spindle 2, and the hub $y$ of the wheel engages on the spindle. When the back C is tubular, the end $x$ of the tube is internally threaded and the wheel-spindle inserted directly therein.

The hoe is made with a flat shank $s$, with a foot or hoe-blade $t$, sharpened on both sides and arranged with the end $t'$ wider than the end $t^2$ at the heel of the shank. This gives it a somewhat shearing cut in whichever direction it is propelled. The shank $s$ is preferably bent to give the hoe part of the implement an action more similar to the action of a hand-hoe. In the implement shown in Fig. 1 the depth of the cut is regulated by the operator. In the implement shown in Fig. 2, with the wheels at the end of the plates $a$ and $b$, the depth of the cut is regulated by adjusting the shank of the hoe-blade between the plates.

The shifting holder enables the workman to quickly move the hoes either to the right or to the left, should such a sudden movement be necessary for the purpose of avoiding injury to a plant or avoiding an obstacle that might injure a hoe-blade.

Any suitable material may be used to make the plates $a$ and $b$ and the back bar C. The construction may be of two iron plates in a wooden back bar or two wooden plates or two iron angle-plates bolted together. The back bar C may be a round bar or tube that constitutes the axle on which the wheels are mounted. In this case the plates $a\ b$ are secured to the bar C by bolts or rivets.

What we claim is—

1. In a weeder and thinner, the combination of parallel plates $a$, $b$, provided with registering holes, a stiffening-back C, secured to the plates $a$, $b$, and hoe-blades having shanks, each of which is provided with a plurality of holes $k$, and a slot $g$, substantially as described.

2. In a weeder and thinner, in combination with parallel plates, depending from a stiffening back piece and provided with a plurality of holes arranged in vertical rows, hoe-teeth having shanks provided with adjustment-holes, wheels, and means for securing the wheels directly to the ends of the tooth-holding bar, substantially as described.

3. In a weeder and thinner, the combination of a hoe-holding bar having parallel plates spaced for the insertion of the shank of a tooth therebetween, and provided with holes for the securing-bolts by which the teeth are held, a threaded receptacle at each end of said bar for the reception of a threaded wheel-spindle, wheels on said spindle and means for propelling the bar, substantially as described.

In testimony whereof we sign this specification in the presence of two witnesses.

ALEXANDER T. FISCHER.
HENRY CORDES.

Witnesses:
MAY E. KOTT,
CHARLES F. BURTON.